(«12») United States Patent
Hyslop (10) Patent No.: US 11,212,719 B2
(45) Date of Patent: Dec. 28, 2021

(54) ARCHITECTURE FOR INTEGRATION OF MULTIPLE NETWORKS IN AN AIR-TO-GROUND CONTEXT

(71) Applicant: SMARTSKY NETWORKS LLC, Morrisville, NC (US)

(72) Inventor: Douglas Hyslop, Vienna, VA (US)

(73) Assignee: SmartSky Networks, LLC, Morrisville, NC (US)

(\*) Notice: Subject to any disclaimer, the term of this patent is extended or adjusted under 35 U.S.C. 154(b) by 0 days.

(21) Appl. No.: 16/649,363

(22) PCT Filed: Sep. 19, 2018

(86) PCT No.: PCT/US2018/051649
§ 371 (c)(1),
(2) Date: Mar. 20, 2020

(87) PCT Pub. No.: WO2019/060354
PCT Pub. Date: Mar. 28, 2019

(65) Prior Publication Data
US 2020/0275327 A1    Aug. 27, 2020

Related U.S. Application Data

(60) Provisional application No. 62/561,423, filed on Sep. 21, 2017.

(51) Int. Cl.
*H04W 36/00* (2009.01)
*H04B 17/318* (2015.01)
(Continued)

(52) U.S. Cl.
CPC .......... *H04W 36/0072* (2013.01); *H01Q 1/28* (2013.01); *H01Q 3/08* (2013.01);
(Continued)

(58) Field of Classification Search
CPC .............. H04B 7/18506; H04B 7/0617; H04B 7/18504; H04B 7/0695; H04B 7/0626;
(Continued)

(56) References Cited

U.S. PATENT DOCUMENTS 7,480,278 B2\*  1/2009  Pedersen ............... H04W 28/16
                                                        370/235
7,693,551 B2\*  4/2010  Ojard ..................... H01Q 21/00
                                                        455/562.1
(Continued)

FOREIGN PATENT DOCUMENTS

EP          2161855 A1       3/2010

OTHER PUBLICATIONS

International Search Report and Written Opinion from related International Application No. PCT/US2018/051649 dated Nov. 30, 2018, all pages cited in its entirety.
(Continued)

*Primary Examiner* — Fred A Casca
(74) *Attorney, Agent, or Firm* — Burr & Forman, LLP (57) ABSTRACT

An inter-network communication controller may include processing circuitry. The processing circuitry may be configured to receive location information associated with an in-flight aircraft being tracked and provided with air-to-ground (ATG) wireless communication services by a first ATG network. The first ATG network may employ beamforming directed to the aircraft to provide the communication services. The processing circuitry may also be configured to provide the location information to a second ATG network to enable the second ATG network to utilize the location information for employing beamforming to establish wireless communication with the aircraft. The first ATG network and the second ATG network may each operate over different ranges of radio frequency (RF) spectrum.

16 Claims, 3 Drawing Sheets

(51) Int. Cl.
*H01Q 1/28* (2006.01)
*H01Q 3/08* (2006.01)
*H01Q 3/24* (2006.01)
*H01Q 3/26* (2006.01)
*H01Q 21/20* (2006.01)
*H04B 7/06* (2006.01)
*H04B 7/185* (2006.01)
*H04L 5/22* (2006.01)
*H04W 16/14* (2009.01)
*H04W 16/28* (2009.01)
*H04W 36/08* (2009.01)
*H04W 74/08* (2009.01)
*H04W 84/06* (2009.01)

(52) U.S. Cl.
CPC ............. *H01Q 3/24* (2013.01); *H01Q 3/2605* (2013.01); *H01Q 21/205* (2013.01); *H04B 7/0617* (2013.01); *H04B 7/0626* (2013.01); *H04B 7/0695* (2013.01); *H04B 7/18504* (2013.01); *H04B 7/18506* (2013.01); *H04B 7/18508* (2013.01); *H04B 17/318* (2015.01); *H04L 5/22* (2013.01); *H04W 16/14* (2013.01); *H04W 16/28* (2013.01); *H04W 36/0016* (2013.01); *H04W 36/00837* (2018.08); *H04W 36/08* (2013.01); *H04W 74/0833* (2013.01); *H04W 84/06* (2013.01); *Y02D 30/70* (2020.08)

(58) Field of Classification Search
CPC .. H04B 17/318; H04B 7/0408; H04B 7/0413; H04B 7/10; H04B 17/336; H04B 7/0697; H04B 7/04; H04B 7/15507; H04W 16/28; H04W 74/0833; H04W 84/06; H04W 24/02; H04W 36/32; H04W 36/08; H04W 16/14; H04W 36/0083; H04W 28/08; H04W 36/00; H04W 36/0016; H04W 36/0061; H04L 2209/80; H04L 25/0204; H04L 49/25; H01Q 1/28; H01Q 21/205; H01Q 3/24; H01Q 3/2605; H01Q 3/08; H04J 11/0079; B64C 39/024; B64C 2201/027; G08G 5/0013; G08G 5/0026; G08G 5/0008; G08G 5/0021; G08G 5/003; G08G 5/0034; G08G 5/0039
See application file for complete search history.

(56) References Cited

U.S. PATENT DOCUMENTS

| | | | | |
|---|---|---|---|---|
| 9,961,664 | B2* | 5/2018 | Chandwani | H04W 64/003 |
| 10,129,906 | B2* | 11/2018 | Rahman | H04B 7/043 |
| 2003/0003913 | A1* | 1/2003 | Chen | H04W 36/0072 455/436 |
| 2007/0161347 | A1 | 7/2007 | Ma | |
| 2014/0266896 | A1 | 9/2014 | Hyslop | |
| 2014/0282684 | A1* | 9/2014 | Keen | H04N 21/422 725/30 |
| 2015/0280806 | A1* | 10/2015 | Jalali | H04B 7/18506 370/316 |
| 2016/0205560 | A1* | 7/2016 | Hyslop | H04B 7/18506 455/454 |
| 2018/0192342 | A1* | 7/2018 | Lim | H04W 36/0072 |
| 2018/0248613 | A1* | 8/2018 | Peitzer | H04B 17/12 |
| 2019/0045406 | A1* | 2/2019 | Kalathil | H04W 36/00837 |
| 2020/0169881 | A1* | 5/2020 | Linton | H04W 12/08 |
| 2021/0092049 | A1* | 3/2021 | Faccin | H04W 8/22 |

OTHER PUBLICATIONS

Communication from related European Application No. 18793058.1 dated Oct. 13, 2021, all pages cited in its entirety.

\* cited by examiner

ARCHITECTURE FOR INTEGRATION OF MULTIPLE NETWORKS IN AN AIR-TO-GROUND CONTEXT

CROSS REFERENCE TO RELATED APPLICATION

This application claims priority to U.S. application No. 62/561,423 filed Sep. 21, 2017, the entire contents of which are hereby incorporated by reference in its entirety.

TECHNICAL FIELD

Example embodiments generally relate to wireless communications and, more particularly, relate to techniques for enabling integration of multiple networks in a wireless air-to-ground (ATG) environment.

BACKGROUND

High speed data communications and the devices that enable such communications have become ubiquitous in modern society. These devices make many users capable of maintaining nearly continuous connectivity to the Internet and other communication networks. Although these high speed data connections are available through telephone lines, cable modems or other such devices that have a physical wired connection, wireless connections have revolutionized our ability to stay connected without sacrificing mobility.

However, in spite of the familiarity that people have with remaining continuously connected to networks while on the ground, people generally understand that easy and/or cheap connectivity will tend to stop once an aircraft is boarded. Aviation platforms have still not become easily and cheaply connected to communication networks, at least for the passengers onboard. Attempts to stay connected in the air are typically costly and have bandwidth limitations or high latency problems. Moreover, passengers willing to deal with the expense and issues presented by aircraft communication capabilities are often limited to very specific communication modes that are supported by the rigid communication architecture provided on the aircraft.

As improvements are made to network infrastructures to enable better communications with in-flight receiving devices of various kinds, it appears likely that legacy ATG networks may overlap with newer ATG networks in certain geographic areas for various periods of time. The different networks may use different portions of the radio frequency (RF) spectrum and/or may employ other structural Although one might expect that users will either use the legacy network or the newer network, it could be that users are actually switched between networks at different times or places. When such opportunities for transferring between networks occur, a methodology for conducting the transfer will be needed. In other words, it may be necessary to develop a relatively seamless way (at least from the user's perspective) by which to integrate more than one ATG network to the advantage of both network operators and users.

BRIEF SUMMARY OF SOME EXAMPLES

The continuous advancement of wireless technologies offers new opportunities to provide wireless coverage for aircraft in-flight by integrating service from potentially multiple networks. In this regard, for example, by employing various integration strategies, users on aircraft can receive improved service from overlapping wireless communication networks that coexist in the same geographical area.

In one example embodiment, an inter-network communication controller including processing circuitry is provided. The processing circuitry may be configured to receive location information associated with an in-flight aircraft being tracked and provided with ATG wireless communication services by a first ATG network. The first ATG network may employ beamforming directed to the aircraft to provide the communication services. The processing circuitry may also be configured to provide the location information to a second ATG network to enable the second ATG network to utilize the location information for employing beamforming to establish wireless communication with the aircraft. The first ATG network and the second ATG network may each operate over different ranges of radio frequency (RF) spectrum.

In another example embodiment, a system for providing inter-network communication is provided. The system may include an in-flight aircraft including a first radio configured to communicate within a ATG network, and a second radio configured to communicate within a second ATG network. The system may also include a plurality of first ATG base stations defining the first ATG network, a plurality of second ATG base stations defining the second ATG network, and an inter-network communication controller comprising processing circuitry. The processing circuitry may be configured to receive location information associated with the aircraft being tracked and provided with communication services by the first ATG network via beamforming, and provide the location information to the second ATG network to enable the second ATG network to utilize the location information for employing beamforming to establish wireless communication with the aircraft. The first ATG network and the second ATG network may each operate over different ranges of radio frequency (RF) spectrum.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals may be used to refer to like elements throughout. Furthermore, as used herein, the term "or" is to be interpreted as a logical operator that results in true whenever one or more of its operands are true.

Some example embodiments described herein provide architectures for improved air-to-ground (ATG) wireless communication performance. In this regard, some example embodiments may provide for the integration of a first ATG network or system (e.g., a legacy system) with a second ATG network or system (e.g., a newer generation system). However, it should be appreciated that the relative ages of the systems involved are not important to the exercising of example embodiments. Thus, the first and second ATG networks could be networks of the same or different generations that simply have different characteristics (e.g., using different spectrum or having other differentiators) that enable them to be at least partially overlapped without creating significant interference or other obstacles to usage in the same geographical area.

Although any ATG networks could be integrated in the manner described herein, one particular non-limiting example will be described in which the first ATG network has an architecture that enables employment of unlicensed band wireless communication with airborne assets, and the second ATG network uses licensed frequency in another communication band. However, it should be appreciated that other networks could be substituted or added and example embodiments would still be applicable to such scenarios.

Accordingly, for example, the first ATG network may include a plurality of base stations on the ground having antenna structures configured to generate a wedge-shaped cell inside which directional beams may be focused. The wedge shaped cells may be spaced apart from each other and arranged to overlap each other in altitude bands to provide coverage over a wide area and up to the cruising altitudes of in-flight aircraft. The wedge shaped cells may therefore form overlapping wedges that extend out toward and just above the horizon. Thus, the size of the wedge shaped cells is characterized by increasing altitude band width (or increasing vertical span in altitude) as distance from the base station increases. Meanwhile, the in-flight aircraft may employ antennas that are capable of focusing toward the horizon and just below the horizon such that the aircraft generally communicate with distant base stations instead of base stations that may be immediately below or otherwise proximal (e.g., nearest) the aircraft. In fact, for example, an aircraft directly above a base station would instead be served by a more distant base station as the aircraft antennas focus near the horizon, and the base station antennas focus above the horizon. This leaves the aircraft essentially unaffected by the communication transmitters that may be immediately below the aircraft. Thus, for example, the same RF spectrum (e.g., WiFi), and even the same specific frequencies the aircraft is using to communicate with a distally located base station may be reused by terrestrial networks immediately below the aircraft. As a result, spectrum reuse can be practiced relative to terrestrial wireless communication networks and the first ATG network and the first ATG network may use a same band of frequency spectrum (e.g., the unlicensed band) as the terrestrial networks without interference.

In the first ATG network, beamforming may be employed to steer or form directionally focused beams to the location of the airborne assets. This further facilitates interference mitigation and increases range. However, it generally also means that the aircraft (or assets thereon) should be tracked to continuously enable beamforming to be accurately conducted to serve the aircraft (or assets thereon).

A second ATG network may use another frequency band (e.g., a licensed band) in order to communicate with airborne assets using directional or focused antenna arrays within corresponding communication cells. The cells created may be operating over a different frequency band than the first ATG network, so interference may be avoided without necessarily employing other structural aspects aimed at preventing interference. Given that the second ATG network may also employ beamforming, the second ATG network may also directionally focus beams toward airborne assets. Thus, the second ATG network may also generally require knowledge and/or tracking of the location of the airborne assets.

As noted above, the first and second ATG networks may have at least some geographical overlap. Thus, in any of the areas of geographical overlap, it may be desirable for any number of reasons to enable a handing over of the airborne assets from one network to the other. For example, an inter-network handover may be desirable for load balancing, for taking advantage of known superior performance of one network over the other in a particular area, for transitioning to or heading toward areas where coverage is incomplete or at least not present for one of the networks, to reduce interference from other external sources, etc. When preparing to conduct the inter-network handover, it may be desirable for the network being relieved (i.e., the presently serving network, which is to handover to the other network) to inform the relief network (i.e., the network to which the handover is being made and therefore the future serving network) at least of the position of the aircraft (or assets thereon) so that the relief network can perform beamforming (e.g., generate or steer a beam) in anticipation of the inter-network handover. Example embodiments may facilitate this process.

Figure 1:
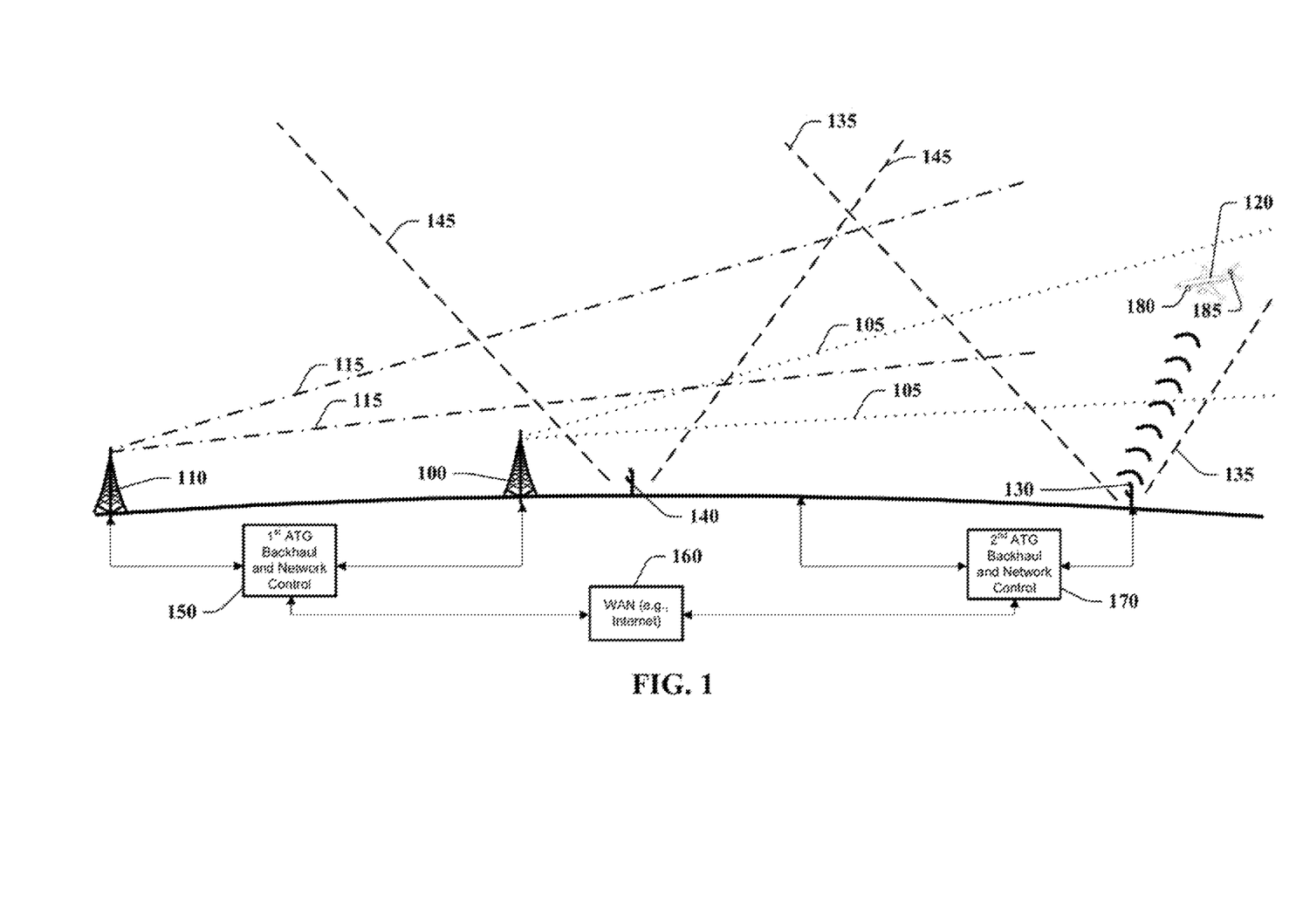
FIG. 1 illustrates a side view of a network topology in which integration of multiple ATG networks may be accomplished in accordance with an example embodiment.

FIG. 1 illustrates an example network architecture for providing integrated service between at least partially overlapping cells of two different ATG networks. FIG. 1 shows only two dimensions (e.g., an X direction in the horizontal plane and a Z direction in the vertical plane), however it should be appreciated that the wedge architecture of the first ATG network may be structured to extend coverage also in directions into and out of the page (i.e., in the Y direction). Similarly, the second ATG network may also provide coverage in three dimensions. Although FIG. 1 is not drawn to scale, it should be appreciated that the wedge shaped cells generated by the base stations for the first ATG network may be configured to have a much longer horizontal component than vertical component. In this regard, the wedge shaped cells may have a horizontal range on the order of dozens to nearly or more than 100 miles. Meanwhile, the vertical component expands with distance from the base stations, but is in any case typically less than about 8 miles (e.g., about 45,000 ft). The second ATG network may have a similar or different architecture but, as discussed above, may employ a different portion of the RF spectrum.

As shown in FIG. 1, a first ATG base station 100 and a second ATG base station 110, which are examples of base stations employed in a first ATG network as described above (e.g., employing wedge shaped cells) may be operating in a particular geographic area. The first ATG base station 100 may be deployed substantially in-line with the second ATG base station 110 along the X axis and may generate a first wedge shaped cell (defined between boundaries 105) that may be layered on top of a second wedge shaped cell (defined between boundaries 115) generated by the second ATG base station 110. When an in-flight aircraft 120 is exclusively in the first wedge shaped cell, the aircraft 120 (or wireless communication assets thereon) may communicate with the first ATG base station 100 using first assigned RF spectrum (e.g., unlicensed spectrum) and when the aircraft 120 is exclusively in the second wedge shaped cell, the aircraft 120 (or wireless communication assets thereon) may communicate with the second ATG base station 110 using the first assigned RF spectrum. The communication may be accomplished using beamforming to form or steer a beam toward the aircraft 120 within either the first or second wedge shaped cell based on knowledge of the location of the aircraft 120. An area of overlap between the first wedge shaped cell and the second wedge shaped cell may provide the opportunity for handover of the in-flight aircraft 120 between the first ATG base station 100 and the second ATG base station 110, respectively. Beamforming may thus be used by each of the first and second base stations 100 and 110 to steer or form respective beams for conduct of the handover. Accordingly, uninterrupted handover of receivers on the in-flight aircraft 120 may be provided while passing between coverage areas of base stations of the first ATG network having overlapping coverage areas as described herein.

In an example embodiment, the same geographic area may also include base stations from at least one other ATG communication network (e.g., a second ATG network). The second ATG network may include a third ATG base station 130 and a fourth ATG base station 140. It should be appreciated that the third and fourth ATG base stations 130 and 140 need not necessarily be in-line with each other or with the first and second ATG base stations 100 and 110. Thus, the spatial relationships shown in FIG. 1 should not be construed as being limiting.

The third ATG base station 130 may generate a corresponding third cell (defined between boundaries 135) that may at least partially overlap with the a corresponding fourth cell (defined between boundaries 145) of the fourth ATG base station. The cell shapes could vary, but at least one of the third and fourth cells associated with the third and fourth ATG base stations 130 and 140 may at least partially overlap with at least one of the wedge shaped cells of the first and second ATG base stations 100 and 110. When the aircraft 120 is exclusively in the third cell, the aircraft 120 (or wireless communication assets thereon) may communicate with the third ATG base station 130 using second assigned RF spectrum (e.g., licensed band spectrum) that is different than the first assigned RF spectrum employed by the first ATG network. When the aircraft 120 is exclusively in the fourth cell, the aircraft 120 (or wireless communication assets thereon) may communicate with the fourth ATG base station 140 using the second assigned RF spectrum. The communication may be accomplished using beamforming to form or steer a beam toward the aircraft 120 within either the third or fourth cell based on knowledge of the location of the aircraft 120. An area of overlap between the third and fourth cells may provide the opportunity for handover of the in-flight aircraft 120 between the third ATG base station 130 and the fourth ATG base station 140, respectively. Beamforming may thus be used by each of the third and fourth base stations 130 and 140 to steer or form respective beams for conduct of the handover. Accordingly, uninterrupted handover of receivers on the in-flight aircraft 120 may be provided while passing between coverage areas of base stations of the second ATG network having overlapping coverage areas as described herein.

In an example embodiment, the first ATG network may include first ATG backhaul and network control components 150 that may be operably coupled to the first and second ATG base stations 100 and 110. The first ATG backhaul and network control components 150 may generally control allocation of the first assigned RF spectrum and system resources of the first ATG network. The first ATG backhaul and network control components 150 may also provide routing and control services to enable the aircraft 120 and any UEs and other wireless communication devices thereon (i.e., wireless communication assets on the aircraft 120) to communicate with each other and/or with a wide area network (WAN) 160 such as the Internet.

In an example embodiment, the second ATG network may include second ATG backhaul and network control components 170 that may be operably coupled to the third and fourth ATG base stations 130 and 140. The second ATG backhaul and network control components 170 may generally control allocation of the second assigned RF spectrum and system resources of the second ATG network. The second ATG backhaul and network control components 170 may also provide routing and control services to enable the aircraft 120 and any UEs and other wireless communication devices thereon (i.e., wireless communication assets on the aircraft 120) to communicate with each other and/or with the WAN 160.

Given the curvature of the earth and the distances between base stations of the first and second ATG networks may be enhanced. Additionally, the base stations of the first and second ATG networks may be configured to communicate with the aircraft 120 using relatively small, directed beams that are generated using beamforming techniques, as mentioned above. The beamforming techniques employed may include the generation of relatively narrow and focused beams. Thus, the generation of side lobes (e.g., radiation emissions in directions other than in the direction of the main beam) that may cause interference may be reduced. However, using these relatively narrow and focused beams generally requires some accuracy with respect to aiming or selection of such beams in order to make the beams locate and track the position of the aircraft 120.

In an example embodiment, beamforming control modules may be employed at the base stations of either or both of the first and second ATG networks. These beamforming control modules may use location information provided by components of the respective networks to direct beamforming to the location of the aircraft 120. When an intra-network handover (e.g., a handover between the first and second base stations 100 and 110, or a handover between the third and fourth base stations 130 and 140) is conducted, each respective ATG network may be fully equipped to share the location information between the base stations of their respective networks. Thus, for example, the first ATG backhaul and network control components 150 may be configured to provide an ability for the first ATG base station 100 and the second ATG base station 110 to each be informed of the location of the aircraft 120 for handovers between the first and second ATG base stations 100 and 110. Meanwhile, the second ATG backhaul and network control components 170 may be configured to provide an ability for the third ATG base station 130 and the fourth ATG base station 140 to each be informed of the location of the aircraft 120 for handovers between the third and fourth ATG base stations 130 and 140. However, the first and second ATG networks would otherwise operate completely independently and would not be integrated together in any way. Example embodiments may provide for integration of the first and second ATG networks to permit handovers therebetween as described herein.

In example embodiments, either the aircraft 120 or wireless communication assets thereon must have a first radio 180 configured to interface with the first and second ATG base stations 100 and 110 of the first ATG network and a second radio 185 configured to interface with the third and fourth base stations 130 and 140 of the second ATG network. The first and second radios 180 and 185 may therefore each be configured to operate in the corresponding first and second assigned RF spectrum in order to stay operably coupled to their respective network components. Thus, any handover between the first and second ATG networks (i.e., an inter-network handover) would also require the aircraft 120 to be enabled to switch between using the first and second radios 180 and 185 (and perhaps corresponding different antennas).

Figure 2:
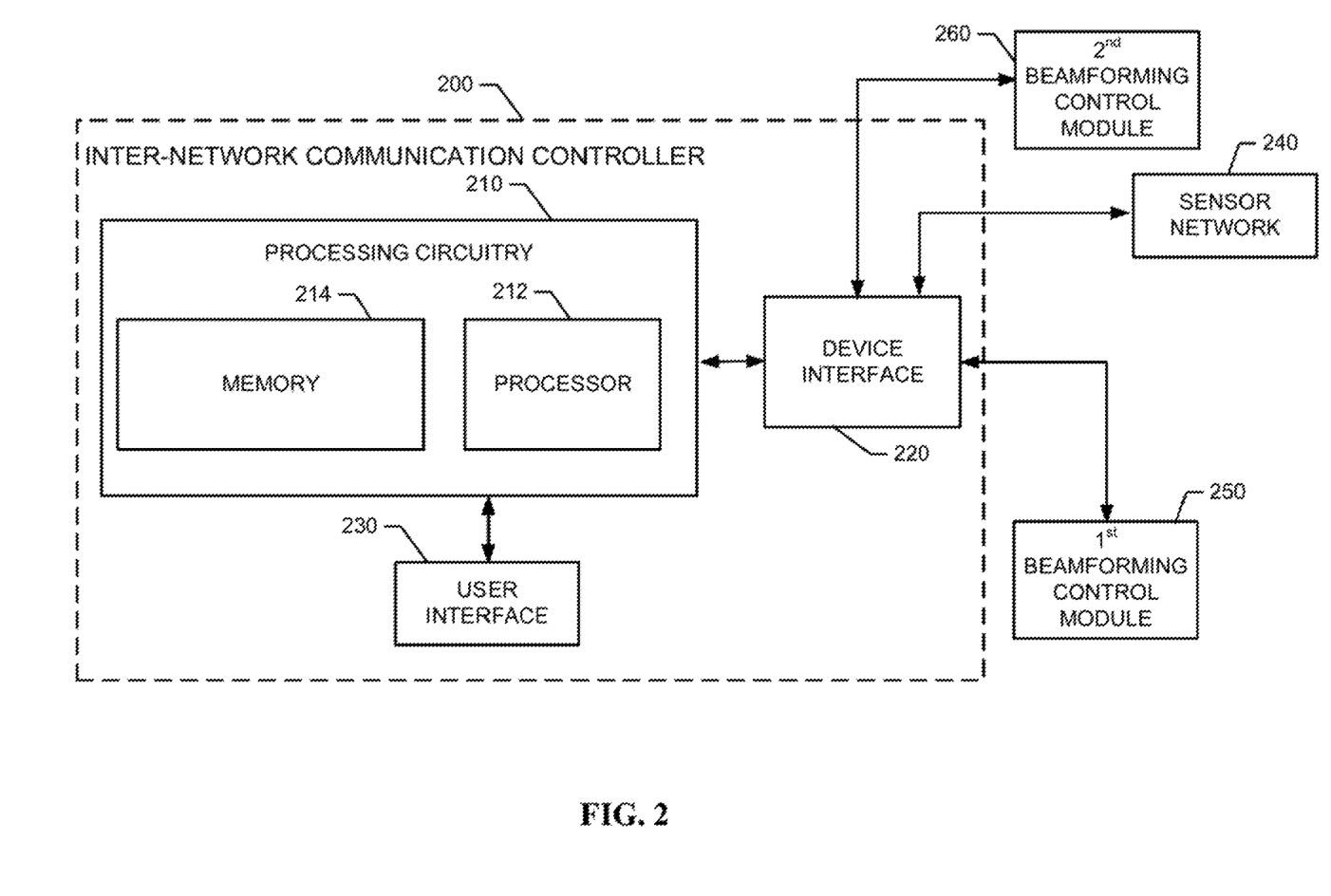
FIG. 2 illustrates a functional block diagram of an inter-network communication controller of an example embodiment.

In order to enable inter-network handover, location information of the aircraft 120 may be shared between the first and second ATG networks in either one or both directions. To accomplish this inter-network sharing, a communication controller of an example embodiment may be employed. FIG. 2 illustrates a block diagram of an inter-network communication controller 200 in accordance with an example embodiment. As shown in FIG. 2, the communication controller 200 may include processing circuitry 210 configured to manage sharing of aircraft location/position information between components of different networks to facilitate an inter-network handover of the aircraft 120 (or wireless communication assets thereon).

The processing circuitry 210 may be configured to perform data processing, control function execution and/or other processing and management services according to an example embodiment of the present invention. In some embodiments, the processing circuitry 210 may be embodied as a chip or chip set. In other words, the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 210 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 210 may include one or more instances of a processor 212 and memory 214 that may be in communication with or otherwise control a device interface 220 and, in some cases, a user interface 230. As such, the processing circuitry 210 may be embodied as a circuit chip (e.g., an integrated circuit chip) configured (e.g., with hardware, software or a combination of hardware and software) to perform operations described herein. However, in some embodiments, the processing circuitry 210 may be embodied as a portion of a computer located in the core network of either of the different networks, or at a central location accessible to both of the different networks. In some embodiments, the processing circuitry 210 may communicate with various components, entities and/or sensors of the different networks to receive information used to determine when to share information between networks, and what information to share. Thus, for example, the processing circuitry 210 may communicate with a sensor network 240 of either or both of the different networks, and may also communicate with or otherwise be operably coupled to a first beamforming control module 250 and a second beamforming control module 260 of the respective different networks.

The device interface 220 may include one or more interface mechanisms for enabling communication with other devices (e.g., base stations, modules, entities, sensors and/or other components of the first and second ATG networks). In some cases, the device interface 220 may be any means such as a device or circuitry embodied in either hardware, or a combination of hardware and software that is configured to receive and/or transmit data from/to base stations, modules, entities, sensors and/or other components of the first and second ATG networks that are in communication with the processing circuitry 210.

The processor 212 may be embodied in a number of different ways. For example, the processor 212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform the operations described herein.

In an example embodiment, the processor 212 (or the processing circuitry 210) may be embodied as, include or otherwise control the operation of the communication controller 200 based on inputs received by the processing circuitry 210 indicative of the position/location of the aircraft 120 (and/or future position of the aircraft 120 at a given time). The position or location information may be received from the first, second, third and/or fourth ATG base stations or from components/modules thereof, or from other entities that may be aware of such information within one or both of the first and second ATG networks. As such, in some embodiments, the processor 212 (or the processing circuitry 210) may be said to cause each of the operations described in connection with the communication controller 200 in relation to cross-network information sharing to facilitate an inter-network handover based on execution of instructions or algorithms configuring the processor 212 (or processing circuitry 210) accordingly. In particular, the instructions may include instructions for determining that it is desirable to initiate an inter-network handover and sharing information between components of the first and second ATG networks to facilitate the inter-network handover.

In an exemplary embodiment, the memory 214 may include one or more non-transitory memory devices such as, for example, volatile and/or non-volatile memory that may be either fixed or removable. The memory 214 may be configured to store information, data, applications, instructions or the like for enabling the processing circuitry 210 to carry out various functions in accordance with exemplary embodiments of the present invention. For example, the memory 214 could be configured to buffer input data for processing by the processor 212. Additionally or alternatively, the memory 214 could be configured to store instructions for execution by the processor 212. As yet another alternative, the memory 214 may include one or more databases that may store a variety of data sets responsive to input from sensors and network components. Among the contents of the memory 214, applications and/or instructions may be stored for execution by the processor 212 in order to carry out the functionality associated with each respective application/instruction. In some cases, the applications may include instructions for directing inter-network information sharing and/or coordination related to the execution of an inter-network handover as described herein. In an example embodiment, the memory 214 may store dynamic position information indicative of a location of the aircraft 120 (e.g., now and in the future) for sharing between networks. The memory 214 may also or alternatively store parameters or other criteria that, when met, may trigger the execution of sharing of the dynamic position information or execution of the handover itself.

In an example embodiment the first beamforming control module 250 may be associated with the first ATG network and the second beamforming control module 260 may be associated with the second ATG network. Moreover, the first beamforming control module 250 may be located at the first or second ATG base stations 100 or 110, or at the first ATG backhaul and network control components 150, while the second beamforming control module 260 may be located at the third or fourth ATG base stations 130 or 140, or at the second ATG backhaul and network control components 170. The first beamforming control module 250 may utilize location information received from any source (e.g., from the aircraft 120 or from other network components of the first ATG network) to form or steer a beam toward the aircraft 120 from the first or second ATG base stations 100 and 110 for reception by the first radio 180. The second beamforming control module 260 may utilize location information received from any source (e.g., from the aircraft 120 or from other network components of the second ATG network) to form or steer a beam toward the aircraft 120 from the third and fourth ATG base stations 130 and 140 for reception by the first radio 180.

Accordingly, the first beamforming control module 250 may be instrumental in handling beam formation on either (or both) sides of an intra-network handover between the first and second base stations 100 and 110 (or other base stations of the first ATG network). Similarly, the second beamforming control module 260 may be instrumental in handling beam formation on either (or both) sides of an intra-network handover between the third and fourth base stations 130 and 140 (or other base stations of the second ATG network). Thus, in some cases, each base station may have its own instance of a beamforming control module, while in other cases one such module may support multiple base stations. However, in the context of an inter-network handover, just one beamforming control module from each respective different network may be involved. As such, the first and second beamforming control modules 250 and 260 represent examples of such components in each respective different network.

The first and second beamforming control modules 250 and 260 will therefore each be responsible to form or steer beams on either side of the inter-network handover and must eventually both have knowledge of the location of the aircraft 120 in order to do so. However, other entities may also have such knowledge (i.e., the location information of the aircraft 120), and thus the first and second beamforming control modules 250 and 260 should merely be appreciated as example devices that could share such information in one example, while other devices could share the information in other examples.

In preparation for an inter-network handover, it may be assumed that the network being relieved (i.e., the network from which the handover is occurring) has been tracking the location information of the aircraft 120. Meanwhile, the relief network (i.e., the network to which the handover is to be conducted) has possibly (more often likely) not been tracking location information of the aircraft 120. However, in order for the relief network to steer or form a beam to the aircraft 120 to relieve the network being relieved, the relief network needs location information for the aircraft 120. If the first ATG network is initially tracking location of the aircraft 120 to provide ATG service thereto via the first beamforming control module 250, and the inter-network handover is to be conducted to the second beamforming control module 260, the communication controller 200 may control the provision of the location information from the first beamforming control module 250 to the second beamforming control module 260. The second beamforming control module 260 may then use the location information to determine the current (and perhaps also future) location of the aircraft 120 to steer or form a beam in the direction of the aircraft 120 so that the handover can proceed.

In some cases, the communication controller 200 may also handle signaling associated with actual execution of the handover. However, the signaling itself can be managed or conducted by other entities as well. It should also be noted that a handover in the reverse direction could also be managed by the communication controller 200 (i.e., from the second beamforming control module 260 to the first beamforming control module 250).

In some examples, the handover may be conducted after a period of simultaneous service has been established. For example, the second beamforming control module 260 may steer or form a beam toward the aircraft 120 and communication services may be established between the second beamforming control module 260 and the second radio 185 on the aircraft 120. After a predetermined period of time of simultaneous service (or at least of service from the relief network (i.e., the second ATG network in this example)), the communication controller 200 may send a relief message to the first beamforming control module 250 to instruct the first ATG network to release or stop forming/steering beams toward the aircraft 120.

It should also be appreciated that to the extent simultaneous service was preferred to conducting a handover, the communication controller 200 could simply never send the relief message and simultaneous service could be maintained to the aircraft 120 via both the first and second ATG networks. Simultaneous service, in this example, is also facilitated by virtue of the sharing of location information between different networks by the communication controller 200. Simultaneous service may provide opportunities to increase service reliability through redundancy, but may also enable increased overall bandwidth available to be provided to the aircraft 120 (and wireless communication assets thereon) by leveraging the combined bandwidth capabilities of both ATG networks.

The communication controller 200 may, in some cases, be further configured to participate in decisions associated with determining any or all of when a handover (or establishment of simultaneous service) should be considered, when to trigger the sharing of aircraft location information in anticipation of a handover, or when to trigger a handover. In some cases, the decision to share information or conduct an inter-network handover may be intended to facilitate inter-network load balancing. For example, the first ATG network may be experiencing bandwidth limitations due to a high volume of users, or other reasons. If the sensor network 240 or other assets of the first ATG network provide information indicating that performance (e.g., in terms of bandwidth or bandwidth per device) of the first ATG network has slipped below a performance threshold, the inter-network handover may be determined to be desirable (or be triggered). Thus, the communication controller 200 may send location information from the network being relieved to the relief network (i.e., from the first ATG network to the second ATG network in this example). This handover may therefore serve to balance loading between the two ATG networks.

In another example, if historical performance data is available for a particular area to indicate that the first ATG network is superior to the second ATG network in the corresponding area (either generally or for the current time of day), the communication controller 200 may trigger sharing of location information and/or the inter-network handover. In some cases, the communication controller 200 may receive data from the sensor network 240 on the performance of each network over time and provide a scoring function indicative of the quality of service for each area for each network. If the scoring functions of the two networks differ by at least a predetermined threshold, the communication controller 200 may initiate location information sharing and/or the inter-network handover.

In still other examples, if aircraft flight plan information or trajectory tracking services are available, it may be possible for the communication controller 200 to evaluate a current or projected (i.e., future) aircraft location to determine whether the aircraft 120 is or will be in an area where coverage is incomplete for one of the networks. Thus, for example, if the second ATG network has a coverage hole and the flight plan of the aircraft 120, or the trajectory of the aircraft 120, indicates that the aircraft 120 will enter the coverage hole, the communication controller 200 may be configured to initiate location information sharing and/or the inter-network handover.

In another example embodiment, the sensor network 240 or other assets of the first ATG network may provide information indicating that interference levels experienced in the first ATG network have reached an interference threshold. In response to the interference threshold being reached, the communication controller 200 may send location information from the network being relieved to the relief network (i.e., from the first ATG network to the second ATG network in this example). Thus, the inter-network handover may also serve to mitigate or respond to high interference situations detected in either one of the two ATG networks.

In an example embodiment, the communication controller 200 may be embodied among either or both of the first and second backhaul and network control components 150 and 170 as respective distinct or distributed components. Alternatively or additionally, the communication controller 200 may be embodied at a common location accessible to both networks (e.g., at the WAN 160 or Internet), or at a core network location. In situations where base stations of different networks are collocated, however, information between the base stations of the different networks could be shared locally at the common site. In such an example, coverage areas associated with the first ATG base station 100 and the third ATG base station 130 of FIG. 1 may be superimposed on top of each other from the same origin. Similarly, coverage areas associated with the second ATG base station 110 and the fourth ATG base station 140 may be superimposed on top of each other from the same origin.

Within the context of an example where base stations of different networks are collocated, the first beamforming control module 250 may be located at the same physical site as the second beamforming control module 260. In this example, if the first beamforming control module 250 is handing over to the second beamforming control module 260, the first beamforming control module 250 may locally store location information continuously or periodically for tracking and subsequent beamforming toward the aircraft 120. The communication controller 200 may also be located at the same site and may receive the location information for storage either continuously, periodically, or on an event driven basis. The communication controller 200 may then, when provision of the location information is dictated (e.g., by the trigger events described above), provide the stored location information to the second beamforming control module 260 to facilitate beamforming for the second ATG network in connection with execution of an inter-network handover. Such an example may provide a distributed architecture with command and control at the site level (i.e., at each individual site where collocation exists) without any separately located (e.g., in the core network or elsewhere) central database. Such a distributed architecture may have an advantage of lower latency control and less backhaul consumed for overhead.

Figure 3:
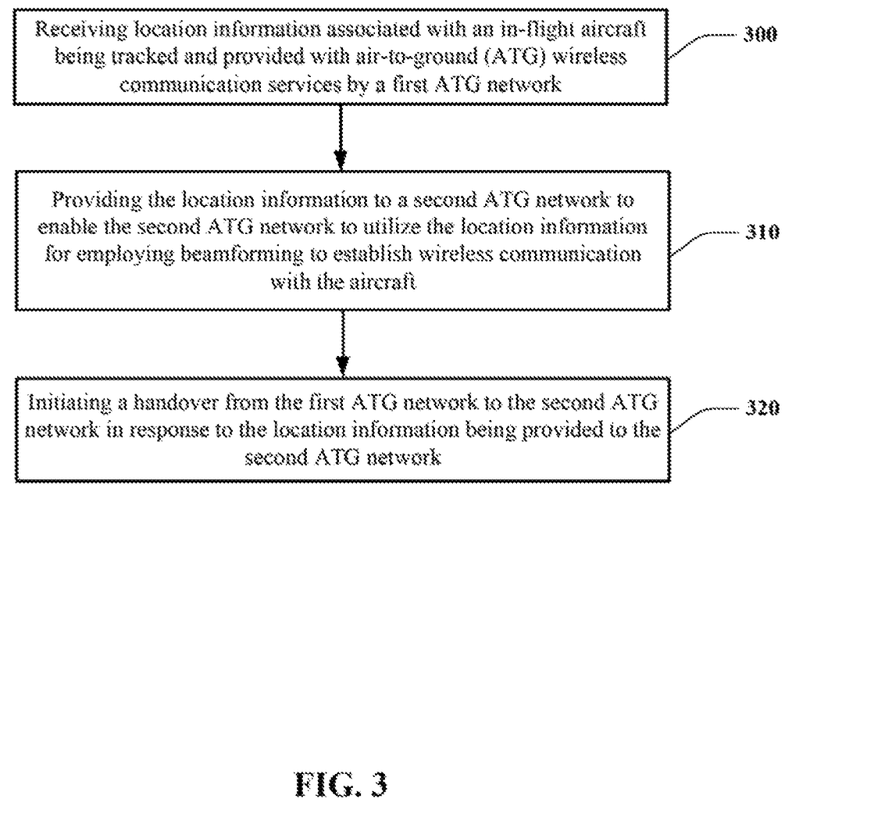
FIG. 3 illustrates a block diagram of a method of conducting integration of ATG networks in accordance with an example embodiment.

FIG. 3 illustrates a block diagram of one method that may be associated with an example embodiment as described above. From a technical perspective, the processing circuitry 210 described above may be used to support some or all of the operations described in FIG. 3. As such, the platform described in FIG. 2 may be used to facilitate the implementation of several computer program and/or network communication based interactions. As an example, FIG. 3 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a device (e.g., the communication controller 200, and/or the like) and executed by a processor in the device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 3, may include receiving location information associated with an in-flight aircraft being tracked and provided with ATG wireless communication services by a first ATG network at operation 300. The first ATG network may employ beamforming directed to the aircraft to provide the communication services. The method may further include providing the location information to a second ATG network to enable the second ATG network to utilize the location information for employing beamforming to establish wireless communication with the aircraft at operation 310. The first ATG network and the second ATG network may each operate over different ranges of RF spectrum.

The method described above in reference to FIG. 3 may include additional steps, modifications, augmentations and/or the like in some cases. Such modifications, augmentations or additional steps may be optional, and may be combined in any way. For example, in some cases the method may further include initiating a handover from the first ATG network to the second ATG network in response to the location information being provided to the second ATG network at operation 320. In some cases, initiating the handover may be triggered in response to an indication of interference in the first ATG network reaching an interference threshold. Additionally or alternatively, initiating the handover may be triggered in response to quality of service related scoring functions associated with each of the first ATG network and the second ATG network differing by a predetermined threshold. Additionally or alternatively, initiating the handover may be triggered in response to performance of the first ATG network falling below a performance threshold. Additionally or alternatively, initiating the handover may be triggered based on a flight plan or trajectory of the aircraft indicating that the aircraft is headed to a coverage hole of the first ATG network. In an example embodiment, the location information may include dynamic position information indicative of a future location of the aircraft at a given future time. In some cases, the first and second ATG networks may each track and communicate with the aircraft simultaneously for at least a predetermined period of time after the second ATG network establishes wireless communication with the aircraft. In an example embodiment, the first ATG network may be directed to stop communicating with the aircraft after the predetermined period of time expires. In some cases, the controller may be disposed at a central location accessible to base stations in each of the first and second ATG networks. However, as an alternative to a centralized location paradigm, a distributed paradigm may be employed in which individual base stations of the first ATG network are collocated with respective individual base stations of the second ATG network, and in which an instance of the controller is disposed at each respective site at which one of the base stations of the first ATG network is collocated with one of the base stations of the second ATG network.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An inter-network communication controller comprising processing circuitry configured to:
receive location information associated with an in-flight aircraft being tracked and provided with air-to-ground (ATG) wireless communication services by a first ATG network comprising a first set of two or more ATG base stations that share a common backhaul, the first ATG network employing beamforming directed to the aircraft to provide the communication services; and
provide the location information to a second ATG network comprising a second set of two or more ATG base stations that do not share the common backhaul of the first set of two or more ATG base stations to enable the second ATG network to utilize the location information for employing beamforming to establish wireless communication with the aircraft,
initiate a handover from the first ATG network to the second ATG network in response to the location information being provided to the second ATG network,
wherein initiating the handover is triggered based on a flight plan and trajectory of the aircraft indicating that the aircraft is headed to a coverage hole of the first ATG network,
wherein the first ATG network and the second ATG network each operate over different ranges of radio frequency (RF) spectrum.

2. The inter-network communication controller of claim 1, wherein initiating the handover is triggered in response to an indication of interference in the first ATG network reaching an interference threshold.

3. The inter-network communication controller of claim 1, wherein initiating the handover is triggered in response to quality of service related scoring functions associated with each of the first ATG network and the second ATG network differing by a predetermined threshold.

4. The inter-network communication controller of claim 1, wherein initiating the handover is triggered in response to performance of the first ATG network falling below a performance threshold.

5. The inter-network communication controller of claim 1, wherein the location information includes dynamic position information indicative of a future location of the aircraft at a given future time.

6. The inter-network communication controller of claim 1, wherein the first and second ATG networks each track and communicate with the aircraft simultaneously for at least a predetermined period of time after the second ATG network establishes wireless communication with the aircraft.

7. The inter-network communication controller of claim 6, wherein the first ATG network stops communicating with the aircraft after the predetermined period of time expires.

8. The inter-network communication controller of claim 1, wherein the controller is disposed at a central location accessible to base stations in each of the first and second ATG networks.

9. The inter-network communication controller of claim 1, wherein individual base stations of the first ATG network are collocated with respective individual base stations of the second ATG network, and wherein an instance of the controller is disposed at each respective site at which one of the base stations of the first ATG network is collocated with one of the base stations of the second ATG network.

10. A system for providing inter-network communication, the system comprising:
an in-flight aircraft including a first radio configured to communicate within a first air-to-ground (ATG) network, and a second radio configured to communicate within a second ATG network;
a plurality of first ATG base stations that share a common backhaul and that define defining the first ATG network;
a plurality of second ATG base stations that do not share the common backhaul with the first ATG base stations and that define defining the second ATG network; and
an inter-network communication controller comprising processing circuitry configured to:
receive location information associated with the aircraft being tracked and provided with communication services by the first ATG network via beamforming, and
provide the location information to the second ATG network to enable the second ATG network to utilize the location information for employing beamforming to establish wireless communication with the aircraft,
initiate a handover from the first ATG network to the second ATG network in response to the location information being provided to the second ATG network
wherein initiating the handover is triggered based on a flight plan and trajectory of the aircraft indicating that the aircraft is headed to a coverage hole of the first ATG network,
wherein the first ATG network and the second ATG network each operate over different ranges of radio frequency (RF) spectrum.

11. The system of claim 10, wherein initiating the handover is triggered in response to an indication of interference in the first ATG network reaching an interference threshold.

12. The system of claim 10, wherein initiating the handover is triggered in response to quality of service related scoring functions associated with each of the first ATG network and the second ATG network differing by a predetermined threshold.

13. The system of claim 10, wherein initiating the handover is triggered in response to performance of the first ATG network falling below a performance threshold.

14. The system of claim 10, wherein the first and second ATG networks each track and communicate with the aircraft simultaneously for at least a predetermined period of time after the second ATG network establishes wireless communication with the aircraft.

15. The system of claim 10, wherein the controller is disposed at a central location accessible to both the first ATG base stations and the second ATG base stations.

16. The system of claim 10, wherein individual ones of the first ATG base stations are collocated with respective individual ones of the second ATG base stations, and wherein an instance of the controller is disposed at each respective site at which pairs of the first and second ATG base stations are collocated.

* * * * *